33-246. XR 3,078,731 SR
CROSS REFERENCE SEARCH ROOM

Feb. 26, 1963 E. J. CATOR 3,078,731
RETICLE ADJUSTING MECHANISM
Filed Dec. 16, 1960

TX 1438

INVENTOR.
EDWARD J. CATOR
BY Frank C. Parker
David E Dougherty
ATTORNEYS

United States Patent Office 3,078,731
Patented Feb. 26, 1963

3,078,731

RETICLE ADJUSTING MECHANISM

Edward J. Cator, Penfield, N.Y., assignor to Bausch & Lomb Incorporated, Rochester, N.Y., a corporation of New York Filed Dec. 16, 1960, Ser. No. 76,371
2 Claims. (Cl. 74—89)

This invention relates to a reticle adjusting mechanism, and more particularly, to an adjusting mechanism which is particularly well-suited for very fine or accurate adjustments of a reticle.

Briefly, the reticle adjusting mechanism according to the present invention comprises a pair of adjusting members which lie in a common plane and which slidably engage the reticle carrier or mount, and means for moving the adjusting members in unison to move the reticle along a first axis. A third adjusting member is provided to slidably engage the reticle carrier or mount and to move the reticle along an axis substantially perpendicular to the first axis.

In another embodiment of the invention, means are provided for separately adjusting the individual members of a pair of adjusting members in order to effect rotational movement of the reticle.

The reticle adjusting mechanism according to this invention is particularly well suited for use in a device having an illuminated cross hair reticle, such as is used in a bore sight or collimator. It is also well suited for use in devices adapted for making fine measurements such as in microscopes, alignment telescopes, and the like.

Advantageously, the new and useful reticle adjusting mechanism disclosed herein provides accurate rectilinear adjustments along $x$ and $y$ axes of the reticle. Specifically, the reticle may be moved along its $x$ and $y$ axes by the rotational movement of a pair of control knobs in a manner that minimizes the possibility of chatter and the adverse effects of grease drag. Furthermore the device overcomes to a high degree the problems attributed to backlash in gears.

The reticle adjusting mechanism made in accordance with this invention incorporates a pseudo self-greasing action which allows for exceptionally smooth adjustments while minimizing wear on the device. The device is rugged and durable in construction, has a high degree of accuracy and is relatively inexpensive to manufacture.

Additionally, the reticle may be rotationally aligned without affecting the accuracy of the adjustments along the $x$ and $y$ axes. The rotational alignment of the reticle is accomplished by utilizing one of the adjusting knobs incorporated for rectilinear adjustment. The latter provision allows for the full control over translational movements by two adjusting knobs.

The invention will now be described in more detail in connection with the drawings in which.

Figure 5:
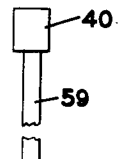
FIG. 5 is a side elevational view partly broken away illustrating a second embodiment of the invention.

FIG. 5$a$ is a bottom view of the embodiment shown in FIG. 5; and

Figure 6:
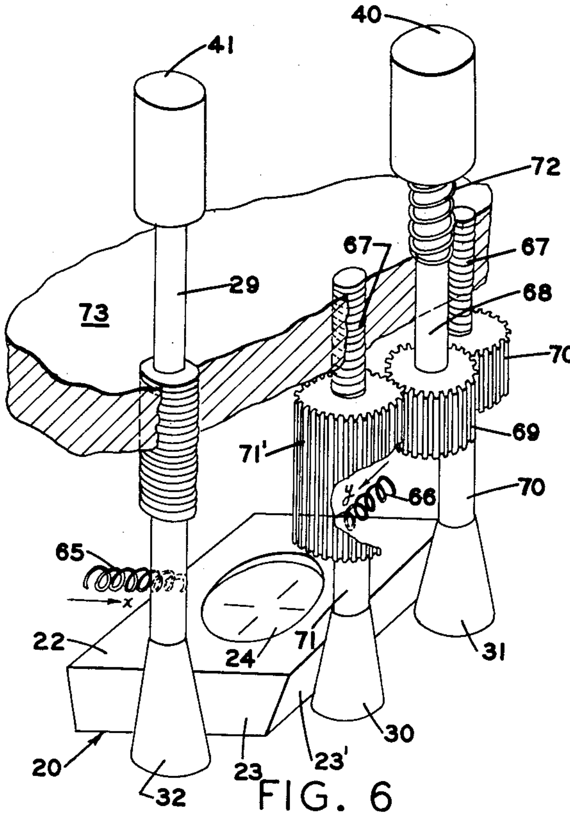

FIG. 6 is an enlarged perspective view, partly broken away, illustrating certain features of a reticle adjusting mechanism made in accordance with a third embodiment of the invention.

Referring now more particularly to the drawings, a reticle assembly generally designated by the numeral 10 is attached to a housing 12 by a bolt 14 which is threaded into the housing 12. An O-ring 16 is placed between the reticle assembly 10 and the housing 12 in order to provide a seal therebetween.

The reticle assembly 10 includes a reticle 20. The reticle 20 comprises a plate 22, and an aluminum coated glass 24 carried by the plate 22. The aluminum coated glass 24 has cross hairs scribed thereon. Two adjacent edges 23, 23' of the plate 22 are chamfered and two opposite edges 27, 27' are relatively flat. A pair of springs 25, 26 engage the flat surfaces, 27, 27' and bias the reticle 20 in the positive $x$ and $y$ directions thereby forcing the chamfered edges 23, 23' of the plate 22 against the cone shaped cams 30, 31 and 32. The cone shaped cams 30, 31 and 32 which slidably engage the chamfered edges 23, 23', are formed on the ends of shafts 28 and 29. The shafts 28, 29 are threadedly received, as indicated at 28' and 29', within the reticle assembly 10. Upon rotation of the shafts 28 and 29 in a clockwise direction the shafts are moved downwardly.

Figure 1:
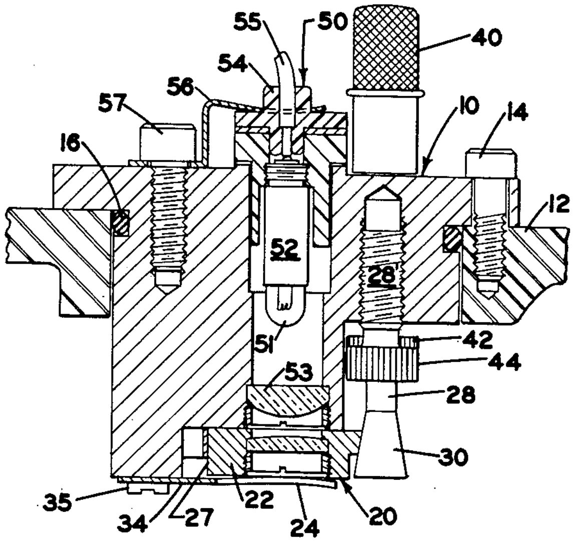
FIG. 1 is a cross sectional view along the zig zag line 1—1 shown in FIG. 2 of a reticle adjusting mechanism according to one embodiment of the invention.
Figure 2:
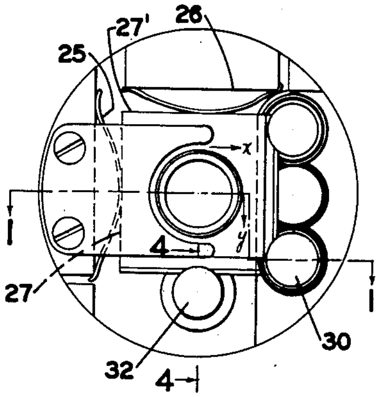
FIG. 2 is a bottom plan view of the device shown in FIG. 1.
Figure 3:
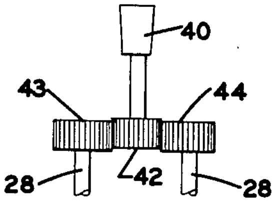
FIG. 3 is a schematic view illustrating the idler gear assembly used in the device shown in FIG. 1.

The actuating mechanism shown most clearly in FIG. 3 includes an idler gear 42. The idler gear 42 actuates gears 43 and 44 in response to the rotation of a knob 40. On rotation of the knob 40 in a counter clockwise manner, the gears 43 and 44 are rotated in a clockwise manner which causes the cams 30 and 31 to move downwardly, allowing the reticle to move inwardly against the smaller portion of the cones, and hence, move along the $x$ axis.

The chamfered edges 23, 23' slope inwardly of the plate 22 at the bottom thereof in order that the springs 25 and 26 may force the chamfered regions against the cone shaped cams, thereby forcing the reticle upwardly against the base portion of the reticle assembly 10. A flat plate 34 held by a screw 35 threaded into the bottom of the reticle assembly 10 bears upwardly on the plate 22 with a slight pressure in order to insure that the reticle remains accurately positioned in the horizontal plane of the device. This also minimizes the possibility of the plate 22 falling from the device in the event that the spring tension becomes insufficient to properly position the plate 22.

The tension of the springs 25, 26 biases the reticle into engagement with the cone-shaped cams 30, 31 and 32. The tension of the springs 25, 26 also exerts a sufficient force on the cone shaped cams to thereby bias the cams and shafts downwardly. The downward bias on the cams and shafts tends to minimize problems associated with the backlash of the gears or looseness of the screw threads.

An illumination system 50 includes a light bulb 51, a light socket 52, condenser lens 53, and a mounting member 54. The mounting member 54 is of insulating material and has a lead 55 inserted therein. The lead 55 provides the electrical contact for the illumination system and is connected to a power source (not shown). The mounting member 54 carrying the bulb 51 and the socket 52 is removably mounted in the device and held therein by a spring clamp 56. The spring clamp 56 is held to the assembly 10 by a screw 57. The illumination system projects an image of the cross hair carried by the glass 24.

Figure 4:
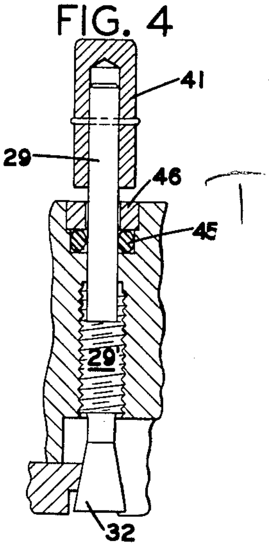
FIG. 4 is a cross sectional view taken along the line 4—4 in FIG. 2.

The cam 32 which moves the reticle in the negative $y$ direction is shown more clearly in FIG. 4. The cam 32 is of generally conical shape and has its smaller diameter terminating in a shaft 29. The shaft 29 is threaded into the assembly 10, and has a knob 41 keyed to its opposite end. The rotation of the knob 41 rotates the shaft 29, raising or lowering the cam 32 and shaft 29 along the threads 29' thereby moving the reticle along the y axis. An O-ring 45 provides a seal between the shaft 29 and reticle assembly 10, and is forced into contact with the shaft 29 by a plug 46. The O-ring 45 exerts a force on the shaft 29 in order to prevent rotation due to vibration and provides a relatively large degree of frictional drag which must be overcome to rotate the knob 41.

Figure 5A:
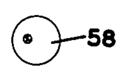

A modification of the cam arrangement is shown in FIGS. 5 and 5a and may be advantageous where it is desirable to produce a device which is relatively inexpensive. The modified cam assembly requires a substantial minimum of fine machining operations due to the arrangement of the various parts. According to the modification the cone shaped cams 30, 31 and 32 are each replaced by an eccentric cam 58. The eccentric cam 58 which replaces the cam 32 is carried on a shaft 59 and is mounted in the assembly 10 in a manner similar to the structure shown in FIG. 4. The modified assembly, however, does not require the shaft 51 to be threaded into the assembly 10. In replacing cams 30 and 31 with cams similar to cam 50, it is not necessary to thread the shafts into the assembly 10. An idler gear assembly as shown in FIG. 3 is retained to actuate the modified cams 50 which replace the cams 30 and 31.

The operation of the reticle adjusting mechanism will be described in conjunction with FIG. 6 which illustrates a third embodiment of the invention. A pair of springs 65, 66 respectively bias the reticle plate 22 in the positive x and y directions and the cams 30, 31 and 32 respectively cooperate with the chamfered surfaces 23 and 23' to move the reticle 20 in the negative x and y directions in opposition to the springs 65 and 66.

Each of the cams 30, 31 and 32 is formed on a shaft having threaded portions 67 threaded into a base member 73. A pair of control knobs 40 and 41 are respectively provided for actuating the cams 30, 31 and 32. The control knob 41 is mounted on the same spindle 29 as the cam 32, whereas the control knob 40 is mounted on a spindle 68 which drives an idler gear 69. The idler gear 69 meshes with gears 70' and 71' integrally formed on the spindles 70 and 71 which have the cams 30 and 31 formed thereon.

By rotating the control knob 40 the cams 30 and 31 are either raised or lowered by the action of the screws 67. The raising or lowering of the cams 30, 31 and 32 is very gradual as such raising or lowering is responsive to the advance of the screws 67. Correspondingly, the movement of the reticle 20 in opposition to the springs 65 and 66 is very gradual.

The idler gear 69 remains in engagement with the gear 71' even though disengaged from the gear 70. Therefore, by pressing the knob 40 downwardly the idler gear 69 is disengaged from the gear 70' which allows for rotational adjustment of the reticle. Consequently, rotation of the knob 40 raises the cam 30 resulting in rotation of the reticle 30. A spring 72 returns the idler gear 69 to its normal position when the force is removed from the knob 40. Thereafter the knob 40 may be rotated resulting in uniform rotation of the gears 70 and 71 which biases the reticle 20 along the x axis.

It is contemplated that changes and modifications may be made in the present invention without departing from the scope thereof.

What is claimed is:

1. A reticle adjusting mechanism comprising a pair of generally cone-shaped adjusting members slidably engaging the reticle, means coupling said pair of adjusting members and means moving said pair of adjusting members in unison for effecting movement of the reticle along a first axis, means overcoming said coupling means and moving one of said cone-shaped adjusting members individually to provide rotational alignment of said reticle, a third cone-shaped adjusting member slidably engaging said reticle for effecting movement of the reticle along an axis substantially perpendicular to said first axis.

2. A reticle adjusting mechanism for a reticle carried by a mount having two chamfered edges comprising a base member, a pair of generally cone-shaped adjusting members slidably engaging one of said chamfered edges of the mount, a spring biasing means forcing one of the chamfered edges of the reticle mount against said pair of adjusting members, said pair of adjusting members threadedly received within said base member, means coupling said pair of adjusting members and means rotating said pair of generally cone shaped adjusting members in unison to raise or lower said adjusting members thereby effecting movement of the reticle along a first axis, means overcoming said coupling means and individually rotating one of said adjusting members of said pairs of adjusting members to raise and lower the same thereby adjusting the reticle for rotational alignment, a third generally cone shaped adjusting member slidably engaging the second chamfered edge of the reticle, spring biasing means forcing the second chamfered edge of the reticle mount against said third adjusting member, said third adjusting member being threadedly received within said base member, means rotating said third adjusting member to raise or lower said third adjusting member thereby effecting movement of the reticle along an axis substantially perpendicular to said first axis.

References Cited in the file of this patent

UNITED STATES PATENTS

| | | |
|---|---|---|
| 1,488,010 | Kourkene | Mar. 25, 1924 |
| 2,097,209 | Cooper | Oct. 26, 1937 |
| 2,500,405 | Fairbank | Mar. 14, 1950 |
| 2,784,493 | Tuffs | Mar. 12, 1957 |
| 2,823,326 | Gerty | Feb. 11, 1958 |